United States Patent
Miura

[15] 3,654,536
[45] Apr. 4, 1972

[54] SYSTEM FOR STOPPING A SINGLE PHASE WOUND COMMUTATOR MOTOR AT A FIXED POSITION

[72] Inventor: Ataka Miura, Kodaira-shi, Japan
[73] Assignee: Janome Sewing Machine Co., Ltd., Tokyo, Japan
[22] Filed: June 18, 1968
[21] Appl. No.: 738,054

[30] Foreign Application Priority Data

June 19, 1967 Japan..................................42/38802

[52] U.S. Cl.............................................318/466, 318/468
[51] Int. Cl........................................................H02p 3/02
[58] Field of Search ........................318/466, 468, 470, 265

[56] References Cited

UNITED STATES PATENTS

| | | | |
|---|---|---|---|
| 2,320,808 | 6/1943 | Lammeren........................318/265 X |
| 2,720,619 | 10/1955 | James....................................318/466 |
| 3,352,396 | 11/1967 | Moseley................................318/468 |
| 3,358,629 | 12/1967 | Bono .....................................318/468 |

Primary Examiner—Benjamin Dobeck
Attorney—Linton & Linton

[57] ABSTRACT

In a phase control system of a motor using a semiconductor switching element such as a symmetrical semiconductor switching element or a semiconductor commutating control element, a series circuit of two switches is provided between a trigger circuit and a predetermined point of a resistor connected in parallel to a main circuit. A first switch will become ON when the current flowing to the motor is stopped, and a second switch is in the form of a drum by the motor so as to be made OFF at every rotation of the same. Thus, the motor is re-rotated at a low speed when the first switch becomes ON, and the motor is stopped at a predetermined position when the second switch is made OFF.

3 Claims, 3 Drawing Figures

Patented April 4, 1972
3,654,536
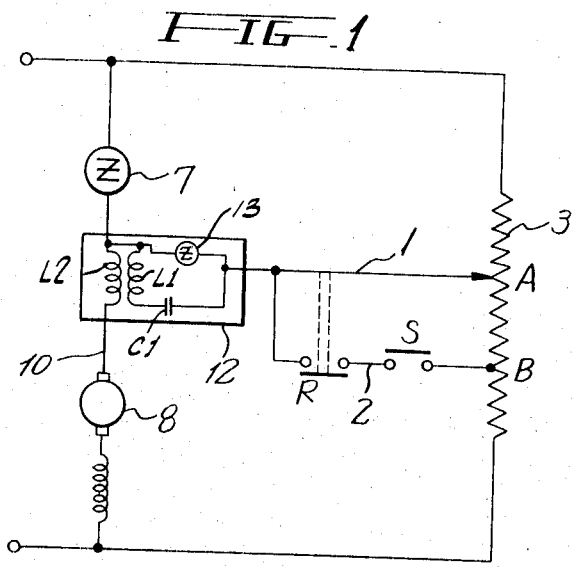
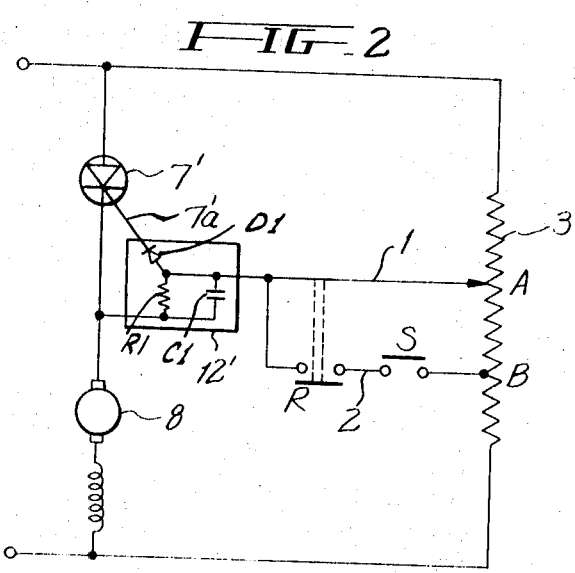
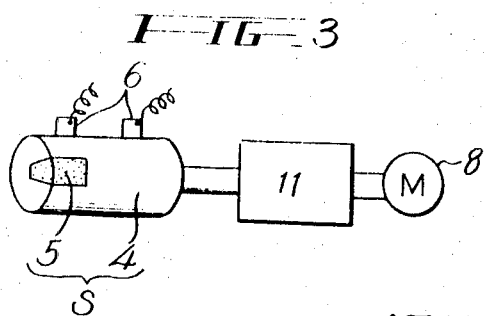
INVENTOR
ATAKA MIURA
BY Linton and Linton
ATTORNEYS

SYSTEM FOR STOPPING A SINGLE PHASE WOUND COMMUTATOR MOTOR AT A FIXED POSITION

DETAILED EXPLANATION OF INVENTION

This invention relates to a device for stopping a single phase series wound commutator motor at a fixed position and is directed to provide a relatively simple system for fixing the stop position of the machine and instrument driven by said motor when they stop.

For driving various kinds of machines and instruments, a single phase series commutator motor has been used. In a sewing machine, as an example of such a machine and instrument, its stop point resides in the vicinity of an upper dead point of the needle. If a stitching cycle is completed at this fixed position, it is very convenient for starting the next stitching. Thus, the positive stop at a fixed position brings about practical advantages for this kind of machine and instrument. If a stitching cycle stops out of this fixed position, it will essentially be required to adjust its stop position by troublesome operation. For stopping the machine and instrument at a fixed position, a variety of methods have been proposed. However, many of them adopt such complicated circuit construction as using an auxiliary motor or moreover, with the addition of an electromagnetic device or a friction disc. This results in making the machine and instrument large sized but nevertheless not to achieve a smooth and appropriate stop at a fixed position. These methods are therefore, not suitable for this object.

The present invention, after consideration of these disadvantages of the prior art, has been created to eliminate them. The main object of the present invention is to improve the operation of the above machine and instrument by providing the exact stop at a fixed position. Another object of the present invention is to provide such stop device in a relatively simple construction for easy operation and to provide it at a low cost. The present invention provides a motor control device using a semiconductor switching element such as a symmetrical semiconductor switching element or a semiconductor control commutating element, and provides a circuit for the re-rotating revolution of the motor, including a contact for detecting the fixed position of the motor in parallel to the resistance adjusting circuit in the motor control device and utilizes the low speed control property obtained by a semiconductor switching element, thereby achieving the positive stop of the motor at a fixed position.

Other concrete characteristics and operation and effect of the present invention will be clearly understood by reading the following explanation of embodiments of the present invention with reference to the appended drawings in which:

FIG. 1 is a circuit diagram of the system according to this invention for stopping a single phase series wound commutator motor at a fixed position thereof, using a symmetrical semiconductor switching element, applied to the speed control device of the motor.

FIG. 2 is a circuit diagram of the system according to this invention for the purpose of the embodiment of FIG. 1, applied to a similar speed control device and using a semiconductor control commutating element.

FIG. 3 is an explanatory view of the structure, for example, of the drum according to this invention for determining the stop position of the motor.

Referring to the embodiment in FIG. 1, a wire 1, a movable wiper A and a resistor 3 forms a resistance adjusting circuit. The movable wiper A slidably contacts the resistor 3 and slides to be OFF at a point of the resistor 3 where the resistance value is of the highest. The resistance adjusting circuit is arranged in parallel to a main circuit 10 composed of a motor 8 and a symmetrical semiconductor switching element 7, and is connected to the same by means of the wire 1 and a trigger circuit 12. The trigger circuit 12 is composed of another symmetrical semiconductor switching element 13, a pulse transformer ($L_1$, $L_2$) and a condenser $C_1$ connected in parallel to each other, the secondary winding of the pulse transformer being connected to the main circuit 10 between the switching element 7 and the motor 8. In parallel to the wire 1 of the resistance adjusting circuit, a circuit 2 for re-rotating the motor is provided. The motor re-rotating circuit 2 includes a first contact R and a second contact S in a series connection, and is at one end fixedly connected to a point B of the resistor 3 where the resistance value is lowest possible to activate the loaded motor while at the other end connected to the trigger circuit 12. The first contact R is, as illustrated, connected to the movable wiper A in such a manner that it operates the motor re-rotating circuit 2 to become ON when the movable wiper A slides to be OFF from the resistor 3, while the second contact S is activated by the motor 8 and operates as a switch providing an OFF position at every rotation of the motor.

Such contact S as exemplified in FIG. 3 is composed of a conductive drum 4, nonconductive portion 5 and contact pieces 6, 6 which act in association with motor 8. When this contact S is driven by the drive portion 11 of motor 8 contact the nonconductive portion 5 with one of the contact pieces 6, the OFF state is attained. In other cases, the contact S in the state of ON.

In the embodiment illustrated in FIG. 2, a semiconductor commutating control element 7' is used in place of the symmetrical semiconductor switching element in the main circuit. The trigger circuit 12' consists of a diode $D_1$ connected between the gate (7'a) of the semiconductor commutating control element 7' and the wire 1, a condenser $C_1$ connected between the negative pole of the semiconductor commutating control element SSS 7' and the positive pole of the diode $D_1$, and a triggering resistor $R_1$ connected to parallel to the condenser $C_1$; the diode $D_1$ is provided for preventing a reverse voltage to the gate 7'a, the condenser $C_1$ is provided for preventing a mistriggering of the control element 7', and at the same time for raising the critical voltage ratio and breakover voltage to cooperate together with the resistor $R_1$, as a filter against an induced noise voltage from outside to the gate 7'a.

OPERATION

In either of embodiments illustrated in FIGS. 1 and 2, the movable wiper A of the resistance adjusting circuit is moved on the resistor to make the speed control according to the operating condition of the machine or instrument driven by motor 8. When it becomes OFF from the variable resistor 3, the resistance adjusting circuit becomes OFF to stop motor 8 and simultaneously the first contact R of the motor re-rotating circuit 2 becomes ON. In case the second contact S is at the position ON, namely at the position out of the fixed position when the first contact R becomes ON, the motor re-rotating circuit 2 is automatically charged to again revolve motor 8. The motor 8 stops when the second contact S reaches the position OFF (A fixed position).

Since a semiconductor switch element is used, in the present control circuit, it operates to make phase control, increase starting torque and to control a low speed so that the rerevolution of motor 8 may be possible at a very low speed so as to fulfil the requirements for the aforementioned stop at a fixed position. Moreover, when wiper A is made ON at the time of a subsequent start, the first contact R becomes OFF, so that resistance adjusting circuit 1 acts quite independently from rerevolution circuit 2, as a prior speed control device.

As above explained, according to the present invention, the motor re-rotating circuit utilizing the property of the semiconductor switching element permits the motor 8 and accordingly the conductive drum 4 to rotate at a low speed thereby to positively determine the stop position of the motor because with such a low speed of rotation the nonconductive portion 5 will never go past one of the contact pieces 6. When the nonconductive portion 5 comes to the contact piece 6, the current will not flow to stop the motor. Further, by mechanically changing the OFF position of the second contact S, the stop position of the motor can be set as desired. Moreover, by virtue of merely providing the motor re-rotating circuit having the first and the second contacts R, S in addition to the resistance adjusting circuit connected to the semiconductor switching element through the trigger circuit, the system of the present invention is of very simple and easy construction requiring materials in small quantity and manufactured and assembled at a low cost. Moreover, this system can be operated by the conventional operating method of prior speed control device without change, requiring no particular operation for stopping at a fixed position. Thus, the present invention is very effective in practical use.

I claim:

1. A system for stopping a single phase series wound commutator motor at a fixed position, comprising a main circuit having a motor and a semiconductor switching element, a trigger circuit connected in parallel to the main circuit to regulate the conduction of said semiconductor switching element, a resistance adjusting circuit connected in parallel to said main circuit and including a resistor and a wiper, and a series circuit of first and second switches connected in parallel to said resistance adjusting circuit, the series circuit being at one end connected to a selected point of said resistor where the resistance value is determined so as to drive the motor at a low speed through said trigger circuit and the semiconductor switching element, the first switch being connected to said wiper and normally closed, and being open when said wiper becomes OFF from said resistor to re-rotate the motor, and the second switch being in the form of a drum driven by the motor and having conductive and nonconductive portions so that said second switch will become open at every rotation thereof to determine the stop position of the motor.

2. A system for stopping a single phase series wound commutator motor at a fixed position as recited in claim 1, said semiconductor switching element being a symmetrical semiconductor switching element.

3. A system for stopping a single phase series wound commutator motor at a fixed position as described in claim 1, said semiconductor switching element being a semiconductor commutating control element.

* * * * *